L. COTE.

Machines for Forming Boot and Shoe Stiffeners.

No. 5,896. Reissued June 2, 1874.

Witnesses.
S. N. Piper
L. N. Höller

Louis Cote'
by his attorney.
R. H. Eddy

A.M. PHOTO-LITHOGRAPHIC Co. N.Y. (OSBORNE'S PROCESS.)

UNITED STATES PATENT OFFICE.

LOUIS COTÉ, OF ST. HYACINTHE, CANADA.

IMPROVEMENT IN MACHINES FOR FORMING BOOT AND SHOE STIFFENERS.

Specification forming part of Letters Patent No. 147,906, dated February 24, 1874; reissue No. 5,896, dated June 2, 1874; application filed May 16, 1874.

*To all whom it may concern:*

Be it known that I, LOUIS COTÉ, of St. Hyacinthe, in the Province of Quebec, of the Dominion of Canada, have invented a new and useful Machine for Forming or Shaping Boot and Shoe Counters or Stiffeners; and do hereby declare the same to be fully described in the following specification, and represented in the accompanying drawings.

The invention or machine consists, mainly, of a rotary head, of a spherical, spheroidal, or sphero-cylindrical shape, fixed upon and concentrically with a rotary shaft, in combination with a stationary mold, correspondingly or approximately so concaved, whereby, by the revolution of the said rotary head within the mold, a piece of leather of suitable form introduced between them may be drawn into and through the concavity of the mold, and receive a curved form lengthwise, and withdrawn, and thereby be adapted for use as a stiffening for a boot or shoe. The invention also consists in such a rotary head and stationary mold, and an elastic cushion or springs arranged underneath the mold, and for it to rest on, in order that the mold, while the leather or blank may be passing through it, may yield and accommodate itself to the said leather or blank as it may vary in thickness. The invention further consists in the combination of such a rotary head, stationary mold, and elastic cushion or bed, with a support-plate and adjusting-screws applied thereto, and a bed-plate or bar, all being as hereinafter explained, and as shown in the accompanying drawings, of which—

Figure 1:
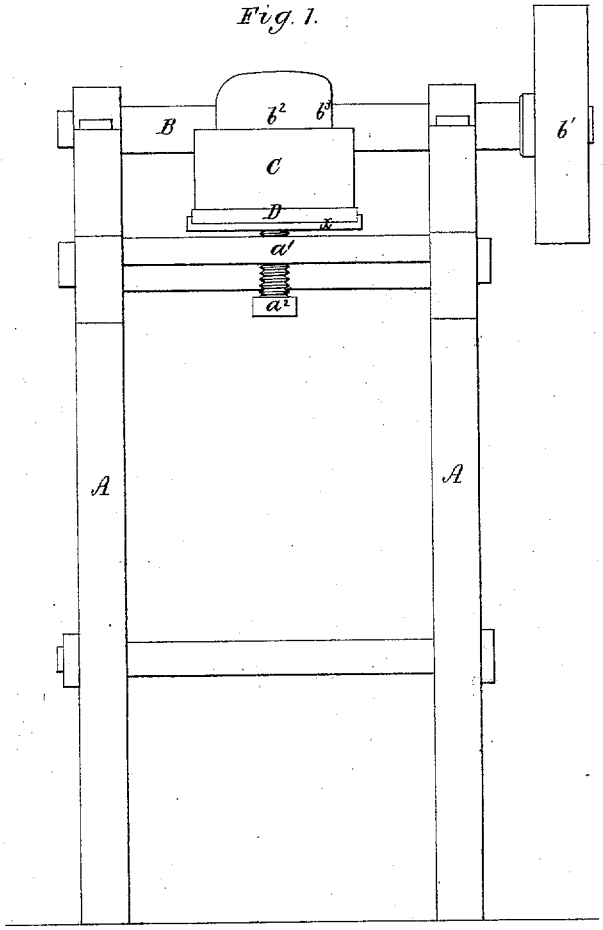
Figure 2:
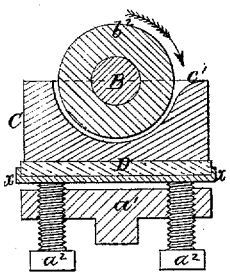

Figure 1 is a front elevation of the machine. Fig. 2 is a transverse section, and Fig. 3 a longitudinal section, of the rotary head, its shaft, the mold, the elastic cushion and its supports. Fig. 4 is a side view of the rotary head and its shaft.

The blank, or piece of leather or material to be bent by the machine, is usually semi-elliptical in form, or approximately so, and by being subjected to the action of the machine will not only be curved longitudinally and laterally concavo-convex, but will be formed with a plaited lip or flange.

In the drawings, A denotes the frame for supporting the operative parts, especially the shaft B, carrying the rotary-head $b^2$, arranged on it as represented. The shaft is provided with a pulley, $b^1$, or other suitable means of revolving it. The mold shown at C is a metallic block, formed with a concavity, the arc of a circle in its transverse section, and in other respects the counterpart or approximate counterpart of that portion of the head which is within it, all being as shown. This mold placed underneath the head rests on a cushion-plate or block, D, of india-rubber, supported on a metallic plate, $x$. The plate $x$ rests on screws $a^2$ $a^2$, screwed into and through the bar $a^1$ of the frame A.

In Fig. 2 the direction of revolution of the head is denoted by an arrow, the mold where it is first to receive the leather being rounded, or made with a mouth, as shown at $c'$.

Figure 3:
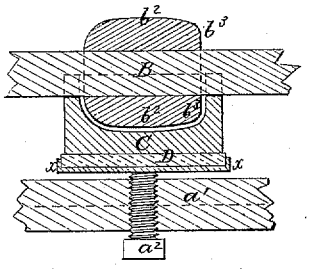
Figure 4:
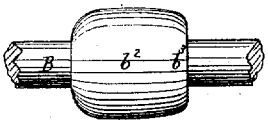

Those parts of the mold and the head, by which the plaited lip or flange is produced, are shown at $b^3$, in Fig. 3.

In using the machine the sheet or piece of leather is to be introduced endwise into the mouth $c'$, when it will be at once seized by the rotary head, and drawn through the mold, and in passing through the mold the piece will be bent, flanged, and plaited, or reduced to the requisite shape.

If desirable, the head may be grooved on its outer surface to facilitate its grasp or hold on the leather or blank. The inner surface of the mold, however, should be very smooth.

What I claim as my invention is as follows—

1. The combination of the rotary shaft B, the head $b^2$, and the mold C, all substantially as described.

2. The combination of the shaft B, the rotary head $b^2$, the mold C, and the elastic cushion D, supported on a bed or plate, $x$.

3. The combination of the rotary shaft B, head $b^2$, the mold C, elastic cushion, the support-plate $x$, bar $a^1$, and adjusting-screws $a^2$, all being substantially as explained.

LOUIS COTÉ.

Witnesses:
R. H. EDDY,
S. N. PIPER.